Figure 1:
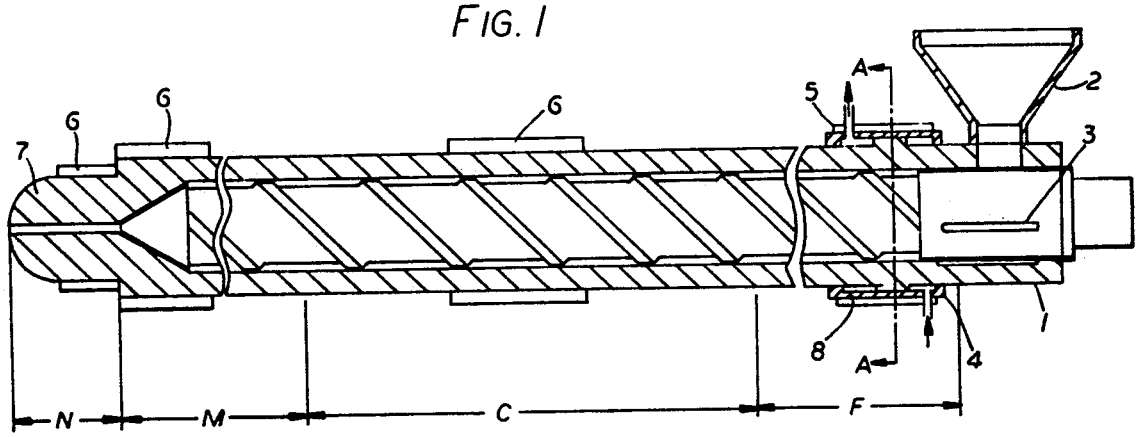

United States Patent [19]

Horikawa et al.

[11] 4,100,245
[45] Jul. 11, 1978

[54] METHOD FOR MANUFACTURING BEARINGS OR OTHER ANTI-FRICTION ELEMENTS FORMED OF LUBRICANT CONTAINED POLYACETAL

[75] Inventors: Masayuki Horikawa, Tokyo; Yataro Takata, Yokohama; Kikuo Sumiyoshi, Tokyo, all of Japan

[73] Assignee: Oiles Kogyo Kabushiki Kaisha, Tokyo, Japan

[21] Appl. No.: 708,370

[22] Filed: Jul. 26, 1976

Related U.S. Application Data

[60] Division of Ser. No. 584,506, Jun. 6, 1975, abandoned, which is a continuation-in-part of Ser. No. 366,425, Jun. 4, 1973, abandoned, which is a continuation-in-part of Ser. No. 36,950, May 13, 1970, abandoned, which is a continuation-in-part of Ser. No. 694,495, Dec. 29, 1967, abandoned.

[30] Foreign Application Priority Data

Sep. 11, 1967 [JP] Japan .................................. 42-57874

[51] Int. Cl.² ............................ D01F 1/02; C10M 5/00
[52] U.S. Cl. ...................................... 264/211; 252/12; 252/12.4; 260/18 N; 260/33.6 R; 264/40.6; 264/169
[58] Field of Search ............. 260/67 A, 33.6 R, 18 N; 264/169, 240, 264, 265, 40.6; 252/12, 12.4

[56] References Cited

U.S. PATENT DOCUMENTS

| | | | |
|---|---|---|---|
| 2,639,275 | 5/1953 | Vickers et al. | 259/4 AB |
| 3,236,929 | 2/1966 | Jupa et al. | 264/328 |
| 3,340,219 | 9/1967 | Stemmler | 260/32.6 |
| 3,779,918 | 12/1973 | Ikeda et al. | 252/12.6 |
| 3,808,133 | 4/1974 | Brown | 252/56 R |
| 3,852,203 | 12/1974 | Morisaki | 252/12 |
| 4,012,478 | 3/1977 | Horikawa et al. | 264/329 |

*Primary Examiner*—Jay H. Woo
*Attorney, Agent, or Firm*—Oldham, Oldham, Hudak & Weber Co.

[57] ABSTRACT

This invention relates to self-lubricating bearings or other antifriction elements formed of a lubricant-containing polyacetal. It can be manufactured in various shapes by molding a powdery mixture of the polyacetal having a bulk factor of 2–8 with 2–12 wt % of the lubricant which is in a liquid state at a normal room temperature or at the melting point of the polyacetal by a screw type injection molding machine having controlled temperatures in the feed, compression, metering and nozzle sections of the heating cylinders.

During the process, the lubricant is uniformly dispersed in said resin material as fine particles independent from each other and this accounts for the extraordinarily high retention of lubricant film which forms on the bearing surface of the molded articles in use.

9 Claims, 2 Drawing Figures

U.S. Patent

July 11, 1978

4,100,245

METHOD FOR MANUFACTURING BEARINGS OR OTHER ANTI-FRICTION ELEMENTS FORMED OF LUBRICANT CONTAINED POLYACETAL

This application is a division of our prior application Ser. No. 584,506, filed June 6, 1975, now abandoned which was a continuation-in-part of our prior application Ser. No. 366,425, filed June 4, 1973 now abandoned, which was a continuation-in-part of our application Ser. No. 36,950, filed May 13, 1970 now abandoned, which was a continuation-in-part of our prior application Ser. No. 694,495, filed Dec. 29, 1967 now abandoned.

BACKGROUND OF THE INVENTION

In the prior art, U.S. Pat. No. 3,850,821 teaches a method for manufacturing bearings by mixing acetal polymer or copolymer with 2–15 wt % of a lubricant, melting the mixture at a temperature more than the melting point of the acetal polymer, cooling the mixture to a solid mass, powdering the lubricant containing polyacetal, and molding the same. However, such method has the disadvantage of lowering the manufacturing efficiency of the molded article, since it requires a relatively long time to have the lubricant, such as No. 30 engine oil corresponding to SAE No. 30, be contained into the polyacetal, and also to powder the lubricant containing acetal polymer.

There is another disadvantage which is liable to depress the quality of polyacetal when it is heated for a long time at a temperature of more than the melting point of polyacetal.

Attempts have been made to solve the foregoing disadvantages in the manufacture of the lubricant containing bearing material. Many ways were tried to manufacture the lubricant containing bearing material from the molding material produced by mixing the polyacetal homopolymer or copolymer powder of various grades with lubricant, but most of them were not successful, except when some kinds of oxymethylene copolymer (celcon flakes M 90) were used as the molding material.

However, it has been found at last from experimental results that the value of the bulk factor of the polyacetal as mentioned below, and the molding conditions determine whether or not a satisfactory molded article or bearing is produced, and that such bulk factor value indicates the maximum amount of the lubricant to be contained in the bearing material for satisfactory article production.

This invention relates to bearings or other antifriction elements formed of the lubricant-containing polyacetal and to a method of making such elements. More particularly, this invention relates to providing bearings or other antifriction elements formed of the polyacetal containing 2–12 wt % of the lubricant uniformly dispersed as finely divided particles separated from each other in the resin.

In the specification, the term "polyacetal" means oxymethylene homopolymer or copolymer of trioxane and ethylene oxide.

Polyacetal as well as nylon resin are generally very excellent in low friction; they have a small difference between a kinetic friction and a static friction and also they have good mechanical strength, namely a wear resistance, a creeping resistance, and a fatigue resistance together with desirable chemical properties, namely resistance to oil and other common organic solvents. These advantageous features of the polyacetal in combination with its other merits accounts for the fact that polyacetal is widely used as engineering plastics, particularly in the field of bearings, gears, cams, liners and other mechanical elements which need a substantial antifriction or wear-resistance feature.

It has, however, been found by us that, if the polyacetal is used under such relatively severe conditions as in a vehicle or an industrial machine without any supplement of a lubricant, they will be unable to exhibit satisfactory bearing performance.

To overcome the disadvantages as mentioned above, it is a common knowledge to apply to the sliding surface of the polymer such lubricants as a mineral oil or grease at the beginning of the use but it is impossible to continue the lubricant effectiveness over long time periods. In case that the lubricant exhausts on the sliding surface, the friction heat increases whereby the wear of the bearing material will be accelerated.

It has been found from various experiments that solid lubricants such as graphite, molybdenum disulfide or lead monoxide serve to improve the load carrying capacity but they do not serve to improve a self-lubricating property or the speed characteristic property and also that polyolefins such as polyethylene or polybutene containing such lubricants as well as other plastics compounded with the lubricant containing polyolefin are not suitable for bearings, since the bearings formed of said bearing material generally lack load carrying capacity and are easy to deform and also cannot be used under any severe conditions.

In order to manufacture plastic bearings having good self-lubricating properties, load carrying capacity and speed characteristic property, it is the most essential matter as confirmed from our experiments to provide the bearings formed of polyacetal containing 2–12 wt % of a lubricant which is in the liquid state at the normal room temperature or at the melting point of polyacetal.

However, many difficulties are encountered to cheaply manufacture polyacetal bearings containing the lubricant in an industrial scale as compared with the manufacture of those containing a solid lubricant such as graphite, since the lubricant is separate from the polyacetal since the lubricant may not be uniformly mixed or dispersed through the polyacetal during an injection of an extrusion molding process whereby a satisfactory molding article or bearing is not produced.

It has been proved from experimental results that the separation of the lubricant from the polyacetal during molding tends to be reduced by use of fine polyacetal powders having the bulk factor of 2 to 8, but the mass production of the molded article is difficult resultant from a lack of moldability of the materials.

In order to improve mixing and kneading the polyacetal powders with the lubricant so as to uniformly disperse the lubricant as finely divided particles through the polyacetal molded article to be produced, a screw type injection or extrusion molding machine is used. But satisfactory result(s) is not yet obtained by the reason that the polyacetal powders containing 2 – 12 wt % of the lubricant slips in the feed section of the heating cylinder of the screw type injection molding machine thereby making it difficult to transfer the polyacetal powders to the nozzle section of the heating cylinder. Said disadvantages have been removed by cooling the feed section of the heating cylinder by means of an appropriate cooling apparatus.

The polyacetal powders mixed with the lubricant are fed to the heating cylinder of the molding machine and melted, and the said lubricant must be uniformly dispersed through the polyacetal and maintained in a dispersed state during the injecting or extruding the polyacetal from the nozzle section. Therefore, in case that the lubricant oozes from the polyacetal melt during molding, the oozed lubricant gathers in the space between the polyacetal melt and the inner surface of the heating cylinder, whereby the polyacetal melt slips within the heating cylinder, and is not kneaded by the screw of the molding machine and is not transferred to the nozzle section. It results in the decomposition of the polyacetal melt thereby making it impossible to mold. In case a solid lubricant such as graphite powders and $MoS_2$ powders which is in the solid state at the melting point of polyacetal are used, the said phenomenon does not occur at all, while in case a lubricating oil which is in a liquid at the normal temperature and paraffin wax which is the liquid state at the melting point of the polyacetal are used, the said phenomenon occurs. When the additional amount of the lubricating oil and the paraffin wax is small, for example less than 2 wt %, it is out of the question that the said lubricant oozes out from the polyacetal. But, when the additional amount of the lubricating oil is 2 – 12 wt % on the basis of the polyacetal, it comes into question. The present invention comprises the two essential conditions or matters, one of which being to use the polyacetal powders having the bulk factor 2 – 8 to obtain the polyacetal molded article having 2 – 12 wt % of the lubricant uniformly dispersed therein, the other of which being to control the temperature of the heating cylinder in a feed section of the screw type or injection type molding machine to that of 40 – 75% of the melting point of the polyacetal in order to uniformly disperse the lubricant through the polyacetal melt during molding and to maintain the lubricant in the dispersed state during molding.

The object of this invention is to provide a lubricant containing polyacetal having superior properties for bearings or other antifriction elements.

Another object of this invention is to provide a lubricant containing polyacetal suitable for bearings or other antifriction elements which polyacetal is highly self-lubricating and has a low coefficient of friction and also is excellent in resistance to wear and in load-carrying capacity and also in speed characteristic property.

Another object of the present invention is to provide an efficient and useful method of molding the lubricant-containing polyacetal having desirable properties for bearings or other antifriction elements.

It has been found that the objects of this invention are accomplished by mixing at a normal room temperature the polyacetal powders having a bulk factor of 2–8 with 2 to 12 wt % of lubricant which is in a liquid state at the normal room temperature or at the melting point of polyacetal and molding the resulting composition by means of a molding machine having controlled temperature zones therein, so that the lubricant may be uniformly dispersed in the polymer as finely divided particles with the assistance of a heat and a pressure during molding.

One of the polyacetal used in this invention is a homopolymer of formaldehyde disclosed in U.S. Pat. No. 2,768,994 specification which does not have a degree of toughness of at least 1, but a reaction rate constant for a thermal degradation at 222° C. of less than 1 wt %/min. and a weight average molecular weight (viscosity method) between 50,000 – 70,000 and a crystalline melting point of 175° C.

Another polyacetal used in this invention is oxymethylene copolymer of trioxane and ethyleneoxide (mole ratio of trioxane/ethylene oxide = 100: about 0.1 – 15) disclosed in U.S. Pat. No. 3,027,352 specification which has a softening point of 162° C., a crystalline melting point of 163° C., a molecular weight average determined by the viscosity method of 50,000 and is called tradenamed "Celcon" sold by Celanese Corporation USA.

The lubricant to be used in this invention is primarily selected from a mineral oil and a synthetic lubricant oil which are in a liquid state at the normal room temperature or may also be selected from paraffins, a higher fatty acid or a higher fatty acid ester, which are in a solid state at the normal room temperature but in a liquid state at the melting point of the polyacetal and grease which is in a jelly state at the normal room temperature. The lubricants may be used solely or mixing one with another. As occasion demands, additives such as lithium stearate, graphite and molybdenum disulfide powders may be added to the polyacetal together with the lubricant. The amount of such additives as graphite and molybdenum disulfide should preferably be limited to less than 5 wt % on the weight basis of the molding composition. Such additive as lithium stearate may be used together with the lubricant in order to improve the dispersibility as well as the retention of the lubricant but the amount of said additive should preferably be limited to less than 3 wt %.

It has been proved that the maximum amount of the lubricant to be contained in the molded article depends on the particle size of the polyacetal powders namely, that the more the particle size of the polyacetal powders decreases, the more the amount of the lubricant to be contained to the molded article will increase.

However, it has been observed that only small amounts of the lubricant may be contained in the polyacetal molded article in spite of using a relatively small apparent particle size of the polyacetal powders, and that a relatively large amount of the lubricant may be contained into the polyacetal molded article, in spite of using a relatively large apparent particle size of the polyacetal powders.

Therefore, it is impossible to estimate the maximum amount of the lubricant to be contained in the polyacetal molded article on the basis of a mesh or a micron of the polyacetal powders owing to the unexpected phenomenon as mentioned above, and also by reason that the mesh or the micron measurement often shows the apparent particle size of the aggregated powders. But as a practical problem, the determination of the actual particle size has many difficulties, especially for small scale manufactures.

Generally speaking, an expression of the particle size of powders is shown as follows:
 (a) mesh by the sieve,
 (b) micron by the microscopic observation,
 (c) surface area of powders ($m^2/gr$),
 (d) density (or apparent density) ($gr/cm^3$).

The mesh or the micron measurement is inadequate as the estimation of the particle size of the polyacetal powders as mentioned above and also the surface area is inadequate since the measurement of the particle size is complicated and has need to use a high cost measurement instrument.

The density or the apparent density is seemed to be preferable to indirectly measure the particle size of powders to estimate the amount of lubricant to be contained to the polyamide molded article.

The inventors have researched for a suitable method for forseeing the maximum amount of the lubricant to be contained in the polyacetal molded article on the basis of the particle size of the plastic powders prior to molding where the lubricant is added to plastics not having any affinity for the lubricant for example in a polyacetal. It has been concluded that said method according to the bulk factor is the most practical, simple and reliable estimating method.

The bulk factor is expressed by the following formula 1, wherein $D_1$ represents the apparent density of the polyacetal powders prior to molding, $D_2$ represents the inherent density of polyacetal itself as generally reported.

$$\text{Bulk Factor} = (D_2/D_1)$$

$D_2 = 1.42$ g/cm$^3$ polyacetal homopolymer.
$D_2 = 1.41$ g/cm$^3$ polyacetal copolymer.

The apparent density is measured by ASTMD : D1895 - 65T, Method A.

It has been discovered from experiments that in order to give the self-lubricating property to the polyacetal molded articles and to improve the load-carrying capacity as well as the speed characteristic property thereof, at least 2 wt % of the lubricant especially more that 3 wt % of the lubricant must be contained in the molded article of the polyacetal so as to uniformly disperse into the polyacetal molded article as finely divided particles. Further, in case of more than 12 wt % of the lubricant being contained in the molded article, it reduces the load-carrying capacity and the moldability of the polyacetal powders and also many voids, or deformation as well as flow marks are easy to create in the molded article thereby depressing the worth of the molded article.

Table 1 shows the relationship between the bulk-factor and the amount of the lubricant to be contained in the polyacetal molded article.

Table 1

| BULK FACTOR | Less than 2 | 2 - 3 | 3 - 4 | 4 - 8 |
| --- | --- | --- | --- | --- |
| Maximum amount of lubricant to be contained (wt%) | less than 2 | less than 5 | less than 8 | less than 12 |

If the apparent density of the polyacetal powders is 0.4, the bulk factor of said powders results in 3.5 from formula 1. Then the maximum amount of the lubricant to be contained is estimated to be less than 8 wt % from the table 1.

In this case, if more than 8 wt % of the lubricant for example 10 wt % thereof is added in the polyacetal powders, excess parts of said lubricant will be excluded during molding and make it impossible to mold due to the presence of the excluded lubricant.

The bulk factor influences not only the amount of the lubricant to be contained but also the dispersibility of the lubricant in the polyacetal molded article as well as the moldability of the polyacetal powders, namely the more the bulk factor increases, the more the moldability of the polyacetal powders and the uniformity as well as the dispersibility of the lubricant contained in the polyacetal molded article improves. Therefore, in case that the polyacetal molded article containing 6 wt % of the lubricant is desired to be manufactured, the polyacetal powders having the bulk factor of 3 – 4 may be used, but the polyacetal powders having the bulk factor of more than 4, namely 4 – 8 is preferable to use.

It has been found from our experiments that the polyacetal powder having the bulk factor of 7 – 8 namely the apparent density of 0.18 – 0.2 gr/cm$^3$ is manufactured according to the following methods as shown in the following item (ii).

In theoretically, the polyacetal powders having the bulk factor of more than 8 may be manufactured, but the maximum value of the bulk factor has been about 8 until now according to our experiments.

The following experiments have been effected by the inventors to obtain polyacetal powders having a bulk factor suitable for containing the lubricant.

(i) Polyacetal pellets (Derlin 500) were pulverized by means of a mechanical pulverizer. The relationship between the particle size (Mesh) of powders manufactured according to the mechanical process mentioned above and the bulk factor was shown in the table 2.

Table 2

| Tyler Mesh | less than 48 | 48 – 65 | 65 – 80 | 80 – 100 | more than 100 |
| --- | --- | --- | --- | --- | --- |
| BULK FACTOR (Average Value) | 1.60 | 1.72 | 1.92 | 2.08 | 2.17 |

(ii) Polyacetal pellets (Derlin 500) were pulverized according to the following process in the presence of a specific solvent.

10 – 20 parts by weight of glycols for example triethylene glycol were added to 1 – 2 parts by weight of the polyacetal pellets and the resulting mixture was heated to the temperature of 165°– 200° C and then allowed to stand to obtain a fine precipitate. The precipitate was filtered and washed with water or alcohol to remove glycol and then dried in vacuum. Fine beautiful powders of the polyacetal were obtained. The interrelationship between the particle size of said powders and the bulk factor thereof was measured as shown in table 3.

Table 3

| Tyler Mesh | 20 – 48 | 48 – 65 | 65 – 80 | 80 – 100 | more than 100 |
| --- | --- | --- | --- | --- | --- |
| BULK FACTOR (Average Value) | 6.95 | 7.00 | 7.00 | 7.00 | 7.05 |

(iii) Some kind of oxy-methylene copolymer, for example Celcon flakes M 90, has been observed from experimental results to have a relative large bulk factor. The interrelationship between the particle size of the polyacetal powders and the bulk factor is shown in the table 4.

Table 4

| Mesh | 20 – 48 | 48 – 65 | 65 – 80 | 80 – 100 | more than 100 |
| --- | --- | --- | --- | --- | --- |
| BULK FACTOR (Average Valve) | 4.50 | 4.55 | 4.60 | 4.65 | 4.76 |

In view of said experiments, it has been concluded that the reason why the powders having the same particle size indicate the different bulk factors as shown in the tables 3 and 4 is due to the aggregation of the polyacetal powders. Therefore, even if the amount of the lubricant to be contained into the polyacetal molded article depends on the actual particle size thereof, the estimation of the lubricant to be contained can not be effected on the basis of the particle size of the polyacetal powders measured by the mesh or the micron, since the mesh or the micron does not indicate the actual particle size of the polyacetal powders but the particle size of the aggregated powders thereof.

Table 5 shows the influences of the amount of lubricants upon the bearing performances. In this table, the lubricant used with polyacetal was SAE #30 engine oil. Additives used include lithium stearate and graphite.

The screw may be driven at the rate between about 1 and 60 rpm, preferably 30–50 rpm.

If the screw is driven at the rate of more than 60 rpm, it becomes difficult to mold.

The compression ratio may be used at the rate between 2.5:1 and 3.0:1; if said ratio is more than 3.0:1, the desired molding article is not manufactured.

In the commercial extrusion molding machine, the single or multiple screw device having various feed throats, for example, vertical, slope or undercut, may be used.

Table 5

| Specimen No. | Polymer wt % | Lubricant wt % | Additives wt % | | Bearing performance | | Maximum PV value |
|---|---|---|---|---|---|---|---|
| | | | Lithium stearate | Graphite | Bearing temp. °C | Coefficient of friction | |
| 1 | Oxy- | 85 | 15 | 0 | 0 | 40 | 0.04 | 1,610 |
| 2 | methy- | 87 | 13 | 0 | 0 | 40 | 0.04 | 1,890 |
| 3 | lene copoly- | 85 | 12 | 3 | 0 | 40 | 0.04 | 2,030 |
| 4 | mer | 88 | 12 | 0 | 0 | 40 | 0.04 | 2,100 |
| 5 | | 87 | 10 | 2 | 1 | 39 | 0.04 | 2,100 |
| 6 | | 90 | 10 | 0 | 0 | 40 | 0.04 | 2,100 |
| 7 | | 90 | 8 | 1 | 1 | 40 | 0.04 | 2,030 |
| 8 | | 92 | 5 | 0.5 | 2.5 | 43 | 0.05 | 1,890 |
| 9 | | 93 | 2 | 0 | 5 | 60 | 0.08 | 1,400 |
| 10 | | 95 | 2 | 3 | 0 | 45 | 0.06 | 1,610 |
| 11 | | 98 | 2 | 0 | 0 | 50 | 0.08 | 1,330 |
| 12 | | 98.5 | 1.5 | 0 | 0 | 90 | 0.13 | 420 |
| 13 | | 99 | 1.0 | 0 | 0 | 100 | 0.20 | 420 |
| 14 | | 100 | 0 | 0 | 0 | 105 | 0.23 | 350 |
| 15 | Oxy- | 87 | 13 | 0 | 0 | 40 | 0.04 | 1,820 |
| 16 | methy- | 84 | 12 | 3 | 1 | 42 | 0.04 | 1,960 |
| 17 | lene | 88 | 12 | 0 | 0 | 40 | 0.04 | 2,030 |
| 18 | homo- | 90 | 8 | 2 | 0 | 40 | 0.04 | 2,030 |
| 19 | poly- | 93 | 4 | 0 | 3 | 46 | 0.06 | 1,680 |
| 20 | mer | 93 | 2 | 0 | 5 | 55 | 0.09 | 1,400 |
| 21 | | 95 | 2 | 3 | 0 | 44 | 0.07 | 1,610 |
| 22 | | 98 | 2 | 0 | 0 | 53 | 0.10 | 1,330 |
| 23 | | 99 | 1 | 0 | 0 | 100 | 0.20 | 420 |
| 24 | | 100 | 0 | 0 | 0 | 107 | 0.24 | 350 |

The tests were conducted on a thrust type friction-wear testing machine under conditions including a sliding speed of 14 m/min and an accumulated load pressure of 5 kg/cm$^2$ per 5 minutes.

The bearing temperature and the coefficient of friction were measured after the lapse of 60 – 80 minutes from the beginning of the test in the condition of the accumulated load pressure of 60 – 80 kg/cm$^2$ and the values thereof were shown by an average value except for specimens Nos. 12, 13, 14, 23 and 24. In said specimens, the values were tested under an integrated load pressure of 15–20 kg/cm$^2$ after the lapse of 15–20 minutes from the beginning of test and the values thereof were shown by the average one.

The maximum PV value was those calculated by the accumulated load pressure at the moment when a specimen polymer begins to melt.

Next, the method of making the bearings or other anti-friction elements of the polyacetal according to the present invention will be described.

In order to manufacture the molded article of this invention, a commercial screw type injection molding machine or extruding molding machine is used. In the commercial injection molding machine, the single or multiple screw device having various feed throats, for example, vertical, slope or undercut, may be used. The screw construction of full-flighted type having constant pitch and varying channel depth may be used.

The length to the diameter ratio of the screw may be ranged from about 12:1 to about 16:1, generally 14:1 to 16:1.

The screw construction of full flighted type having either constant pitch and varying channel depth or the semi-compression type and varying channel depth may be used.

The semi-compression type means the type having the slope part containing about two pitches between the feed section and the metering sections of the screw.

The length to the diameter ratio may range from 12:1 to about 24:1, generally the range of 18:1 to about 22:1 is employed. The screw may be driven at rates between about 1 and 60 rpm and most preferably between about 30 and 40 rpm. When the screw is driven at the rates of more than 60 rpm, it becomes difficult to mold.

The compression ratio of the range between 2.5:1 and 3.0:1 is generally employed. If said ratio reaches more than 3.1:1, the desired molding article is not obtained.

In order to manufacture the molded article of this invention, it is necessary to arrange a specific cooling apparatus in the feed section F of the heating cylinder 1 of the screw type molding machine having the screw construction as mentioned above and as shown in FIGS. 1 and 2.

Figure 2:
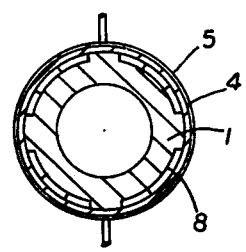

These and other objects, features and advantages of the present invention will become apparent from the following description when taken in conjunction with the accompanying drawings in which:

FIG. 1 is a schematic vertical cross section of the heating cylinder of the molding machine designed for use in practicing the method of the present invention; and FIG. 2 is a transverse cross section of the heating cylinder substantially taken along the line AA in FIG. 1.

Referring to the drawings and particularly to FIGS. 1 and 2, reference numeral 1 generally indicates the heating cylinder of the screw type molding machine; 2 indicates a hopper for feeding molding material; 4 a cooling device; 5 and 6 heaters; and 7 a nozzle. Obviously, a conventional propelling or feed screw is accommodated in the cylinder 1. Reference characters F, C, M and N indicate the feed, compression, metering and nozzle sections, respectively, of the heating cylinders. A conventional screw 10 is shown in the molding machine and it has the same sections therein as the heating cylinder or barrel.

The cooling device 4 includes an appropriate enclosed space 8 extending about the periphery of the feed section F of the heating cylinder and pump means (not shown) suitably connected for circulation of cooling liquid or gas through the space 8. Arranged also about the periphery of the feed section F is heater means 5 which is outside of the cooling device 4 and particularly of the space 8. The pump (not shown) and heater means 5 are selectively connected to a common electric power supply source through a change over switch so that the heater means 5 remains disconnected as long as the pump means is held energized to keep the cooling device in action. Owing to such alternative heating and cooling arrangement, the feed section F of the heating cylinder can be controlled so as to maintain a predetermined relatively low temperature and the whole heating cylinder can be held at a predetermined temperature gradient rising toward the nozzle section N of the cylinder.

The molding conditions for the polyacetal powders containing 2–12 wt % of lubricant has to be altered in the comparison with that of said polymer or copolymer powders containing less than 2 wt % of lubricant to manufacture the molded article without expelling the lubricant from the polyacetal during molding.

Table 6 shows the relationship between the temperature of the feed section F of the heating cylinder and the time required to feed the molding material from the feed section to the head or nozzle section of a screw type injection molding machine of 3 ounces capacity, said molding material being prepared by mixing 2–12 wt % of a lubricant with 88–99 wt % of the polyacetal having the bulk factor of 2–8.

Table 6

| Temperature ° C. in Feed Section (F) | 65–120 | 120–150 | more than 150 |
| --- | --- | --- | --- |
| Hour (sec) required to feed a molding material | 10–30 | 30–120 | Impossible to feed |

Generally speaking, in the screw type injection molding machine of 3 ounces capacity, the heating cylinder of the feed section is 200° C ± 5° C and the time (second) required to feed the molding material from the feed section to the head or nozzle section is preferable to be 10–30 seconds in industrial scale production of molded articles of polyacetal not containing any lubricant.

As shown in the Table 6, it is necessary to maintain the temperature of the feed section to 65° – 120° C as well as the time required for feeding the molding material to 10–30 seconds to manufacture the bearings or antifriction elements of this invention. If said temperature is more than 120° C, the molding material of polyacetal containing the lubricant will not be able to be molded on an industrial scale since the longer time namely 30–120 seconds than that suitable for molding polyacetal is consumed and decomposition of polyacetal may occur.

While if said feed section temperature is too low, namely less than 65° C, it will be difficult to transfer the molding material from the feed section to the head or nozzle section of the molding machine thereby consuming much time in transfer and also about 30% excess of power than that necessary for molding a polyacetal not containing any lubricant. The temperatures of the compression, metering and nozzle sections of the heating cylinder except that of the feed section in the molding of the polyacetal powders containing 2–12 wt % of lubricant are the same or less than those of polyacetal molding material not containing the lubricant.

Table 7 shows the preferable temperature distribution at various parts of the heating cylinder of said injection molding machine.

Table 7

| Heating cylinder | Feed section (F) | Compression section (C) | Metering section (M) | Nozzle section (N) |
| --- | --- | --- | --- | --- |
| Temperature ° C | 65–120 | 120–190 | | 170–200 |

It was observed that a time of more than several ten second units required to feed the molding material from the feed section to the head or nozzle section of the molding machine brings not only a lowering of work efficiency but also a heat deterioration of the material in the heating cylinder, and also that a temperature of the heating cylinder in the feed section suitable for polyacetal not containing any lubricant makes the feed of said molding material of the invention impossible.

Summarizing said experiment results, it is preferable to select the temperature of the heating cylinder in the feed section to that of lower than 75%, especially about 40–50% of the melting point of the polyacetal used and to control the temperature of the heating cylinder in the sections except the feed section to the same ones or less than the molding temperatures for polyacetal not containing the lubricant. Thus it has been found that molded articles suitable for bearings or other antifriction elements can be manufactured.

The preferable temperature distribution shown in the Table 7 is always controlled to the predetermined temperature range by automatic "ON-OFF" of the magnetic contact points connected to the thermocouples provided for the barrel of each section of the heating cylinder.

It is to be noted that lubricant-containing polyacetal molded articles made according to the present invention do not lose their lubricant even when heated, and that said molded articles cannot contain any further oil if tried to be impregnated therein. In this point, said molded article is different from oil-contained sintered porous articles.

Some examples of practicing the present invention will next be described.

EXAMPLE 1

5 wt % of SAE #30 engine oil, 0.5 wt % of lithium stearate and 2.5 wt % of graphite powder of 150 mesh were added to 92 wt % of Celcon flakes M 90 having the bulk factor of 4.50 and mixed together therewith at the normal room temperature to form a dry, loose powder. This was fed to the screw type injection molding machine, having its heating cylinder controlled to a temperature of 70 ± 3° C in the feed section, 160 ± 3° C in the compression section, 190 ± 3° C in the metering section, and 173 ± 3° C in the nozzle section of the cylinder for production of tubular oil-contained molded articles of 16 mm outer diameter and 10 mm inner diameter. The bearing performances of the products correspond to those listed in Table 5 for Specimen No. 8.

The said screw type injection molding machine used in this and the following examples takes the following dimensions, namely:
 Screw type: full flighted screw, constant pitch,, varying channel depth
 Screw design: (L/D) 16
 Compression ratio: 2.5
 Number of rotations: 50 rpm

EXAMPLE 2

8 wt % of SAE #30 engine oil, and 2 wt % of lithium stearate were added to 90 wt % of the Derlin 500 powders having the bulk factor of 6.95 and mixed together therewith at the normal room temperature to form a dry, loose powder. This was fed as a molding material to the screw type injection molding machine having its heating cylinder controlled in temperature to 70 ± 3° C in the feed section, 180 ± 3° C in the compression section, 190 ± 3° C in the nozzle section of the cylinder for production of the tubular oil-contained molded articles of 10 mm inner diameter and 16 mm outer diameter. The bearing performances of the product correspond to those listed in Table 5 for Specimen No. 8.

EXAMPLE 3

8 wt % of SAE #30 engine oil and 1 wt % of lithium stearate and 1 wt % graphite powder of less than 150 mesh were added to 90 wt % of the Celcon flakes having the bulk factor of 4.50 and mixed together therewith at the normal room temperature to form a dry, loose powder. From this mix, tubular oil-contained molded articles similar to those described in Example 2 were produced by use of the screw type injection molding machine having its heating cylinder temperature controlled to 70 ± 3° C in the feed section, 170 ± 3° C in the compression section, and 195 ± 3° C in the metering and the nozzle sections of the cylinder for production of the tubular oil-containing molded articles of same size as shown in Example 1 without separating any lubricant during molding. The bearing performances of the products correspond to those shown in Table 5 for specimen No. 7.

EXAMPLE 4

2 wt % of SAE #30 engine oil were added to 98 wt % of Derlin 500 powders having the bulk factor of 2.17 and mixed together therewith at the normal room temperature to form a dry loose powder. From this mix, tubular oil-contained molded articles similar to those described in Example 1 were produced by use of the screw type injection molding machine having its heating cylinder temperature controlled to 75 ± 3° C, 180 ± 3° C in the compression section, 190 ± 3° C in the metering section and 195 ± 3° C in the nozzle section of the cylinder without separating any lubricant during molding.

The bearing performances of the products are shown in Table 5 for Specimen No. 22.

It should be noted that the range of materials used includes lithium stearate from 0 to 3% by weight and 0 to 5% graphite or molybdenum disulfide.

It will be understood that a suitable mold can be connected to the nozzle section of the extrusion machine or that the nozzle 7 can be changed to form a product such as a tube. Such extruded tube can be cut into articles to provide the molded bearing or equivalent production.

The screw type extrusion molding machine used in the present invention is the normal equivalent of the screw type injection molding machine. Both molding machines are operated at the same molding conditions, for example, at the temperature gradient of the heating cylinder. The selection of either the screw type extrusion molding machine or the screw type injection molding machine depends on the object of application of the molded article, namely the screw type extrusion molding machine is used to manufacture a continuous tube, rod, filament and plate like the molded article, and also plastic coated wire or rod. The said continuous tube-like molded article is used to manufacture the bushing by cutting in the radial direction and the washer type thrust bearing by cutting into slices. The said process is suitable to manufacture relative small amounts of bushings and washers for the reason that the relative cheap die suitable for molding or injecting the tube-like molded article can be used instead of the expensive mold for the injection molding.

While several complete embodiments of the invention have been disclosed herein, it will be appreciated that modification of these particular embodiments of the invention may be restored to without departing from the scope of the invention.

What is claimed is:

1. A method of making bearings or other anti-friction elements characterized by comprising the steps of uniformly mixing at the normal room temperature polyoxymethylene or copolymers of trioxane and ethylene oxide having the bulk factor of 2 – 8 in the starting material, with 2 to 12 wt % of a lubricant which is in a liquid state at normal room temperature or the melting point of the polymer or copolymer to form a molding composition, the lubricant being from the group consisting of a mineral oil and a synthetic lubricant oil which are in a liquid state at the normal room temperature; or from paraffins, a higher fatty acid or a higher fatty acid ester, which are in a solid state at the normal room temperature but in a liquid state at the melting point of the material being processed; and grease which is in a jelly state at the normal room temperature;

and molding the resultant molding composition to form the element by use of a screw type injection or extrusion molding machine, the temperature of the feed section of the cylinder of the machine which has been controlled to that of 40 – 75% of the melting point of the material used, and having the cylinder temperature controlled to about 65° – 120° C in the feed section, about 120° – 190° C in the compression section, and about 170° – 200° C in the metering and the nozzle sections of the cylinder.

2. A method of making bearings or other antifriction elements as claimed in claim 1, characterized by the step of forming the molding composition from one representative of the group of materials consisting of polyoxymethylene powder, and copolymer powders of trioxane and ethylene oxide; said lubricant; and from added material selected from the class consisting of 0 – 3 wt % of lithium stearate, and 0 – 5% of graphite or $MoS_2$ powder.

3. A method of making bearings or other antifriction elements as in claim 1 and including using engine oil as the lubricant.

4. A method of making bearings or other antifriction elements as in claim 1 and including selecting the powders from the group consisting of polymethylene having a molecular weight between 50,000 – 70,000 and a melting point of 175° C, and copolymer powders of trioxane and ethylene oxide having a melting point of 163° C and a molecular weight of 50,000.

5. A method as in claim 1 including the step of mixing 3 to 12% by weight of mineral oil or synthetic lubricating oil with the starting material.

6. A method of making bearings or other antifriction elements characterized by comprising the steps of
   (a.) Selecting the starting material from the group of materials consisting of polyoxymethylene or copolymers of trioxane and ethylene oxide having the bulk factors of 2 – 8;
   (b.) Uniformly mixing at normal room temperature the starting material with 2 to 12 wt % of a lubricant which is in a liquid state at normal room temperature or the melting point of the polymer or copolymer to form a molding composition, the lubricant being from the group consisting of a mineral oil and a synthetic lubricant oil which are in a liquid state at the normal room temperature;
   (c.) Placing the resultant molding composition in a screw type injection or extrusion molding machine and controlling the temperature of the feed section of the cylinder of the machine to that of 40 – 75% of the melting point of the starting material; and,
   (d.) Molding the composition to form the bearing element.

7. A method of making bearings or other antifriction elements as in claim 6, and including the steps of providing the starting material as a powder and selecting the powders from the group consisting of polyoxymethylene, having a molecular weight between 50,000 – 70,000 and a melting point of 175° C, and copolymers of trioxane and ethylene oxide having a melting point of 163° C and a molecular weight of 50,000.

8. A method of making bearings or other antifriction elements as in claim 6, and including controlling the cylinder temperatures to 65° – 120° C in the feed section, 120° – 190° C in the compression section, and 170° – 200° C in the metering and the nozzle sections of the cylinder.

9. A method of making bearings or other antifriction elements as claimed in claim 6, characterized by the step of forming the molding composition from one representative of the group of materials consisting of polyoxymethylene powder, and copolymer powders of trioxane and ethylene oxide; said lubricant; and from added material selected from the class consisting of 0 – 3 wt % of lithium stearate, and 0 – 5% of graphite or $MoS_2$ powder.

* * * * *